Sept. 19, 1939.　　　　K. HEINDLHOFER　　　　2,173,446
WELDING ELECTRODE SPACING MEANS
Filed Dec. 30, 1937
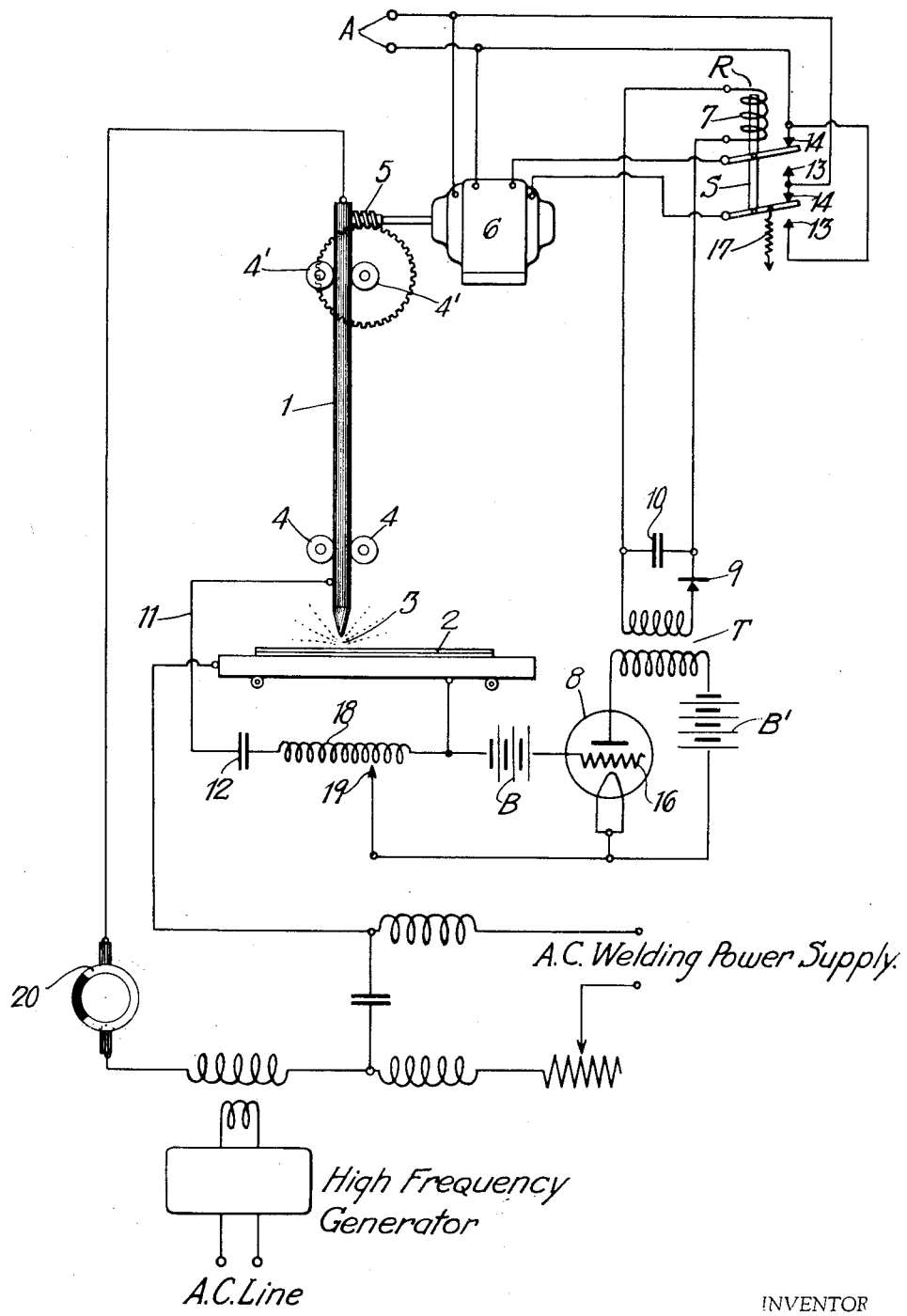
INVENTOR
KALMAN HEINDLHOFER.
BY
ATTORNEYS Patented Sept. 19, 1939

2,173,446

UNITED STATES PATENT OFFICE 2,173,446

WELDING ELECTRODE SPACING MEANS

Kalman Heindlhofer, East Orange, N. J., assignor to United States Steel Corporation, New York, N. Y., a corporation of New Jersey Application December 30, 1937, Serial No. 182,567

8 Claims. (Cl. 219—8)

This invention relates to arc welding and more particularly to machine arc welding and to means for automatically controlling the arc gap to maintain the same within relatively narrow limits. In the arc welding of light gauge sheet material such an automatic control over the arc gap is highly desirable.

In co-pending application Serial No. 175,510, filed November 19, 1937, which application is assigned to the same assignee as the present invention, there is described and claimed a method and means for welding light gauge sheet material by machine arc welding. The present applicant is one of the joint applicants of said co-pending application.

The method of said co-pending application, briefly stated, consists in superposing a high frequency sparking electric power upon a lower frequency welding electric power and providing means to periodically interrupt the two said powers thereby extinguishing the welding arc for a determined time interval after which the arc is re-established for another determined time interval. The periodic extinguishing of the welding arc prevents lateral displacement of the arc from the desired welding path and prevents sticking of the arc to any one point on the work piece with resultant burning through of the light gauge material.

The present invention contemplates the automatic control or regulation of the length of the arc gap by means of the high frequency sparking voltage. In the practice of the present invention the essential difference between the spark and the arc is taken advantage of.

An electric spark under atmospheric temperature and pressure requires considerable voltage of the order of magnitude of a thousand volts or more for a small gap of say $\frac{1}{16}''$. A spark is characterized by short duration not exceeding say $\frac{1}{1000}$ of a second. An arc occurs usually (though not necessarily) between electrodes at very high temperature, i. e. at the vicinity of the boiling point of the electrode material; as a consequence, of this high temperature, the voltage necessary between electrodes is only 20 to 40 volts, i. e. its order of magnitude is much smaller than that of the spark. Since the electrode temperature is the chief factor, which determines whether an electric discharge at ordinary conditions should become a spark or an arc, it was proposed in the identified co-pending application to interrupt all current flowing through the welding electrode, to give the arc sufficient time to cool off to a point, at which a renewed application of the relatively low voltage of the welding power would not be sufficient to maintain the arc, but the latter would be ignited by a considerably higher voltage, supplied by high frequency power, sufficient to break down the gap. This sparking voltage is approximately proportional to the arc gap, hence it would be a more accurate means to evaluate the length of gap than the ordinary welding current or voltage.

It is this ignition voltage upon which I now propose to base an arc gap control, such as is shown in the accompanying drawing illustrating the present invention diagrammatically. At the left upper section of this diagram is indicated the vertical welding electrode 1 separated from the work 2 by a gap 3, and guided between rollers 4—4, 4'—4', three of which are idle and one of which is coupled by a worm drive 5 to a motor 6 having a constant field. The direction of rotation of motor 6 therefore depends upon the direction of its armature current. Means to reverse the armature current to motor 6, including a reversing switch S and magnetic relay device R, is in the right upper corner. The magnetic or pick-up coil 7 of the relay R is energized by current supplied by a triode vacuum tube 8 (or a pair of Thyratrons) whose plate circuit is coupled by a transformer T with the relay pick-up circuit including the coil 7. The transformed current from the transformer T is rectified by rectifier 9 and evened out by a condenser 10 shunted across this transformer-rectifier combination before passing to coil 7. The flow of plate current from tube 8 is controlled by the electrical potentials on grid 16 of the vacuum tube 8 which is biased by a battery B in such a way that low potentials, such as the voltage applied on the grid 16 through by-pass conductor 11 and suppressed by the condenser 12, is insufficient to make the tube 8 conductive, i. e. no plate current can flow to energize the relay coil 7. In the arrangement shown, when this condition exists the motor 6 is energized by the current applied from source A to the lower relay contacts 13 in a direction causing an upward movement of the electrode 1. This upward movement of electrode 1 continues until the sparking voltage across gap 3 becomes sufficiently high to exceed the bias of the battery B. The grid 16 then becomes charged positive inducing a plate current to flow through the vacuum tube 8 and through the primary winding of transformer T.

This current induces a current in the secondary winding of transformer T which after rectification by rectifier 9 energizes coil 7 of the relay device R and shifts switch S to the upper position shown. The motor armature, being now under the influence of the upper relay contacts 14—14, is energized in the reverse direction and moves the electrode 1 down at a slow rate until the sparking voltage across gap 3 becomes reduced sufficiently to effect a reduction of plate and relay coil energizing current to the point where spring means 17 causes switch S to shift to contacts 13—13 whereupon a reversal of the motor 6 occurs and electrode 1 is again moved upward. Under proper adjustment the electrode 1 can be made to oscillate up and down with the required slowness, within specified limits. The high frequency inductance 18 serves as a voltage divider or reducer to adjust the voltage intended for the grid 16 to assume the correct value; the position of the adjustable tap 19 determines the range of the grid voltage.

The welding and high frequency circuits are shown with the commutator 20 necessary to interrupt simultaneously the welding and the high frequency currents substantially as described in one specific embodiment of the above identified co-pending application, and further specific description then indicated by the drawing accordingly need not be made.

By the arrangement illustrated in the drawing and above described I am able to maintain the arc gap 3 between work piece 2 and electrode 1 within relatively narrow limits thereby insuring substantially uniform welding results in accordance with the method and means described and claimed in said above identified co-pending application. It is apparent that the method and means of the present invention may be widely varied without departure from the same and all such modifications and adaptations are contemplated as may fall within the scope of the following claims.

What I claim is:

1. The method of controlling the space gap between an electrode and a work piece during arc welding which comprises impressing a welding current comprised in part of a high frequency high voltage arc maintaining current across the space gap, by-passing a portion of the said high frequency current around the said space gap, and utilizing the voltage fluctuations in said by-passed portion incident to variations in the break down voltage in said space gap to actuate means operative to advance the electrode towards the work piece when the voltage approximates a determined maximum and to retract the electrode when the voltage approximates a determined minimum.

2. The method of controlling the space gap between an electrode and a work piece during arc welding which comprises simultaneously passing a welding current and a high frequency sparking current across said space gap, by-passing a portion of said sparking current around said space gap, impressing said portion on the grid electrode of a three-electrode vacuum tube device, and utilizing the plate current of said device to actuate means operative to advance the said electrode towards the said work piece when the electrical potential on said grid approaches a determined maximum and to retract the electrode from the said work piece when the said electrical potential approaches a determined minimum.

3. The method of controlling the space gap between the end of an electrode and a work piece which comprises sustaining said electrode with the end thereof in a desired position relative to said work piece, providing means to advance and to retract said electrode towards and from said work piece, impressing a welding current comprised in part of a high frequency high voltage arc maintaining current across the space gap between the end of the electrode and said work piece, utilizing the voltage variations in a portion of said high frequency current across said space gap incident to variation in the length of said space gap to actuate means operative to energize the electrode advancing means when the voltage reaches a determined maximum and to energize the electrode retracting means when the voltage reaches a determined minimum.

4. The method of controlling the space gap between the end of a movable electrode and a work piece which comprises passing a welding current comprised in part of a high frequency arc maintaining current across the said gap, by-passing a portion of said high frequency current around the gap and applying said portion to the grid electrode of a three-electrode vacuum tube device, utilizing the plate current of the said device to energize the actuating coil of a relay device adapted to shift a switch means back and forth between two sets of contacts energized reversely, and electrically connecting the said contacts to a motor means adapted to advance and retract the said movable electrode depending upon which of said sets of contacts is electrically connected therewith by the said relay device.

5. Means for controlling the space gap between an electrode and a work piece, said means comprising means to sustain said electrode in desired position relative to said work piece, means to advance and retract the electrode relative to said work piece, means to pass a welding current consisting in part of a high frequency arc maintaining current across the space gap between the electrode and work piece, means to by-pass a portion of said high frequency current around the space gap, and means actuated by variations in the potential of said by-passed portion to actuate the said advancing means when the said potential approximates a determined maximum and to actuate the said retracting means when the said potential approximates a determined minimum.

6. Apparatus for regulating the space gap between the end of an electrode and a work piece comprising in combination a reversible motor actuated means to advance and to retract the said electrode end towards and away from the said work piece, a switch means adapted in one position to actuate said motor means in one direction and in an opposite position to actuate said motor means in the other direction, means to pass a welding current consisting in part of a high frequency arc maintaining current across the space gap between the end of the electrode and said work piece, means to by-pass a portion of said high frequency current around said space gap, and means actuated by variations in the electrical potential of said by-passed portion to actuate means operative to throw said switch means in a position actuating said motor means to advance the said electrode when the said potential approximates a determined maximum and to retract the said electrode when the said potential approximates a determined minimum.

7. In welding apparatus including a vertically sustained electrode and a horizontally disposed work piece and means to maintain relative movement between said electrode and work piece, a means for regulating and controlling the space gap between the end of the electrode and said work piece, said means including a motor actuated means to advance and to retract said electrode end towards and away from said work piece, means to pass a welding current consisting in part of a high frequency arc maintaining current across the space gap between said electrode end and said work piece, and means energized by the variation in electrical potential of said high frequency current incident to variation in the electrical resistance of said space gap to actuate means operative to energize said motor means to advance the said electrode towards the said work piece when said potential approximates a determined maximum and to retract the said electrode from said work piece when the potential approximates a determined minimum.

8. In the combination of claim 7, said last mentioned means including a triode vacuum tube, means to impress a determined negative bias on the grid electrode of said tube, means to superpose thereon a portion of the said high frequency current on the grid electrode of said triode tube, means to convert the alternating plate current of said tube into direct current, means to impress the said direct current onto the actuating coil of a magnetic relay device, and means actuated by said relay device to reverse the direction of motion in said motor actuated means.

KALMAN HEINDLHOFER.